2,924,595

POLYMERIZATION PROCESS USING METAL PYROPHOSPHATE HYDRATE-BF₃ CATALYST

Joe T. Kelly, Dickinson, and Harmon M. Knight, La Marque, Tex., assignors to The American Oil Company, Texas City, Tex., a corporation of Texas No Drawing. Original application April 24, 1956, Serial No. 580,256. Divided and this application March 18, 1957, Serial No. 646,833

2 Claims. (Cl. 260—94.9)

This invention relates to a process for polymerizing ethylene, and is a division of application Serial No. 580,-256, filed April 24, 1956, and now abandoned.

Commercial grade anhydrous boron trifluoride may be utilized as one member of the catalyst pair.

The other member of the catalyst pair, hereinafter spoken of as the solid member, is a metal pyrophosphate hydrate, i.e., a metal pyrophosphate salt containing water of hydration. The salt may be used as a fine powder, as pellets, or may be supported on a solid carrier such as alumina, charcoal, silica gel, etc. Not all metal pyrophosphates which contain water of hydration are suitable, nor are all metal ions suitable. The particular metal ion component of the pyrophosphate salt hydrates is aluminum, beryllium, cadmium, cobaltous, cuprous, ferrous, ferric, manganous, nickelous, stannic, thorium, titanium, zinc and zirconium.

It is necessary that the above-defined metal pyrophosphate salts contain hydrate water. The anhydrous salts do not have any promotional effect on the activity of $BF_3$. In those cases wherein a salt may exist in forms having various amounts of water of hydration present, it is not necessary that any particular hydrate be used. Apparently it is necessary only that some water of hydration be present.

The $BF_3$ and the defined salt react to form a solid material containing complexed $BF_3$. When the salt hydrate and $BF_3$ are contacted in a closed vessel, the $BF_3$ partial pressure drops very rapidly at first and then gradually approaches a constant value. It appears that a very rapid reaction between the $BF_3$ and some of the water of hydration takes place. This initially rapid reaction is then followed by a relatively slow reaction between the remaining molecules of hydrate water and additional $BF_3$. In the case of ferric pyrophosphate containing 11 moles of hydrate water per mole of the salt, it appears that 4 or 5 moles of hydrate water are rapidly reacted. However, stirring of finely powdered hydrate salt in the presence of excess $BF_3$ at about room temperature for a period of about 20 hours, results in the reaction of 1 mole of $BF_3$ for each mole of hydrate water present in the ferric pyrophosphate hydrate. It appears that when the salt hydrate is exposed to $BF_3$, even in the presence of hydrocarbon reactants, eventually all of the water of hydration will become associated with $BF_3$ on about a 1 mole of $BF_3$ per mole of hydrate water basis.

In general, the process is carried out utilizing an amount of $BF_3$ which is in excess of that required to complex with all the hydrate water present in the contacting zone, namely, in excess of about 1 mole of $BF_3$ per mole of hydrate water present in the defined salt. It is preferred to complex all the water of hydration; i.e., have the complex contain about 1 mole of $BF_3$ per mole of hydrate water present; and have free-$BF_3$ present in a weight ratio of $BF_3$ to ethylene of between about 0.2 and 1.5

The contacting of the ethylene in the presence of the defined catalyst pair is continued until an appreciable amount of ethylene polymer has been produced.

It has been pointed out that the solid member of the catalyst pair is really a complex of the metal pyrophosphate-salt hydrate and $BF_3$; the $BF_3$ apparently reacting with the water of hydration. The complex may be preformed, by exposing the salt hydrate to $BF_3$ for a time sufficient to introduce some $BF_3$ into the solid component or even enough to complex all of the water of hydration; this being done before the reactants are introduced into the reaction zone or even before the solid member of the catalyst pair is positioned in the reaction zone. The complex may be formed in situ during a batch-type reaction. In the batch-type operation, it is convenient to introduce all the $BF_3$ into the reaction vessel at once. This amount of $BF_3$ is sufficient not only to complex with the water of hydration but also provide the desired amount of free-$BF_3$. In a flow system, the solid member may be prepared in situ by charging fresh hydrate salt to the reaction zone and forming the complex during the initial passage of reactants and $BF_3$ over the salt hydrate.

The process may be carried out at a temperature between about $-20°$ C. and $100°$ C.; atmospheric temperatures on the order of $13°$ to $34°$ C. are suitable.

RUN NO. 1

In this run, ferric pyrophosphate $.9H_2O$ and $BF_3$ was used as the catalyst pair in a run charging only ethylene as the hydrocarbon.

A 1.4 liter bomb was charged with 50 grams of ferric pyrophosphate $.9H_2O$ and 505 grams of C.P. n-hexane. The bomb was rocked while 56 grams of $BF_3$ were pressured in slowly. The rocking was continued until the $BF_3$ pressure had become constant. Over a period of 3 hours, 170 grams of ethylene were added to the bomb. A sample of the material was withdrawn for Pody analysis. The n-hexane was stripped from the remainder of the product which was a tacky viscous mass. The hydrate salt was recovered with a dark coating. The coated salt was extracted in a Soxhlet extractor for 8 hours using hot benzene. The benzene was distilled away to recover the dissolved material. The conditions and yields of this run are set out in Table I. This run shows that this salt hydrate and $BF_3$ catalyst pair is effective in producing high molecular weight ethylene polymer.

Table I.—Ethylene polymerization using ferric pyrophosphate plus $BF_3$

| Run No. | 27 |
|---|---|
| Temperature (° C.) | 13-34 |
| Time (Hours) | 3½ |
| Pressure (p.s.i.g.) | 175-300 |
| $BF_3/C_2=$(Wt.) | 0.4 |
| Yields: | |
| Ethylene Added _____ gm__ | 170 |
| Ethylene Reacting (Pody Data) _____ gm__ | 116 |
| C₆ Soluble Polymer: | |
| Yield from Pody Data _____ gm__ | 54 |
| Actual Polymer Recovered _____ gm__ | [1] 66 |
| C₆ Insoluble Polymer: | |
| Actual Polymer Recovered _____ gm__ | [2] 12 |
| Total Polymer Recovered _____ gm__ | 78 |

[1] Bromine No. 43, Iodine No. 64, MAV 6.6.
[2] MAV 16.0 (MAV=Maleic Anhydride Value).

We claim:

1. An ethylene polymerization process which comprises contacting ethylene at a temperature between about $-20°$ C. and $100°$ C. in the presence of liquid hexane solvent for a time sufficient to produce an appreciable amount of ethylene polymer in the presence of a catalyst comprising essentially (i) a ferric pyrophosphate salt containing water of hydration, and (ii) boron trifluoride, said $BF_3$ being present in an amount in excess of one mole per mole of hydrate water present in said salt, and recovering ethylene polymer from product hydrocarbon mixture obtained from said contacting zone.

2. The process of claim 1 wherein the $BF_3$ is present in an amount of about 1 mole per mole of hydrate water present in said salt and free-$BF_3$ is present in a weight ratio of $BF_3$ to ethylene of between about 0.2 and 1.5.

References Cited in the file of this patent

UNITED STATES PATENTS

| | | |
|---|---|---|
| 2,183,503 | McAlevy | Dec. 12, 1939 |
| 2,416,106 | Linn et al. | Feb. 18, 1947 |
| 2,748,090 | Watkins | May 29, 1956 |